United States Patent
Cohen et al.

(10) Patent No.: US 9,813,283 B2
(45) Date of Patent: Nov. 7, 2017

(54) EFFICIENT DATA TRANSFER BETWEEN SERVERS AND REMOTE PERIPHERALS

(75) Inventors: Ariel Cohen, Cupertino, CA (US); Abhinav Anand, Milpitas, CA (US); Pierre Aulagnier, Sunnyvale, CA (US); Gerald Cheung, Palo Alto, CA (US); Naveed Cochinwala, San Jose, CA (US); Greg Lockwood, Redwood City, CA (US); Ganesh Sundaresan, San Jose, CA (US); Susheel Tadikonda, Santa Clara, CA (US); Vikram Venkataraghavan, Santa Clara, CA (US); Ming Wong, San Jose, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1522 days.

(21) Appl. No.: 11/200,761

(22) Filed: Aug. 9, 2005

(65) Prior Publication Data
US 2013/0138758 A1   May 30, 2013

(51) Int. Cl.
*G06F 15/16* (2006.01)
*H04L 29/08* (2006.01)
*G06F 13/10* (2006.01)

(52) U.S. Cl.
CPC ........ *H04L 29/08549* (2013.01); *G06F 13/10* (2013.01); *H04L 67/1097* (2013.01); *H04L 69/32* (2013.01)

(58) Field of Classification Search
CPC .................................................. G06F 13/10
USPC ........................................................ 709/219
See application file for complete search history.

(56) References Cited

U.S. PATENT DOCUMENTS

| | | |
|---|---|---|
| 5,621,913 A | 4/1997 | Tuttle et al. |
| 5,754,948 A | 5/1998 | Metze |
| 5,815,675 A | 9/1998 | Steele et al. |
| 5,898,815 A | 4/1999 | Bluhm et al. |
| 6,003,112 A | 12/1999 | Tetrick |
| 6,069,895 A | 5/2000 | Ayandeh |
| 6,145,028 A | 11/2000 | Shank et al. |

(Continued)

FOREIGN PATENT DOCUMENTS

| | | |
|---|---|---|
| CN | 104823409 | 8/2015 |
| EP | 2912805 | 9/2015 |

(Continued)

OTHER PUBLICATIONS

Liu et al., "High Performance RDMA-Based MPI Implementation over InfiniBand", *ICS'03*, Jun. 23-26, 2003, San Francisco, California, USA, Copyright 2003, ACM 1-58113-733-8/03/0006.

(Continued)

*Primary Examiner* — Kevin Mai
(74) *Attorney, Agent, or Firm* — Kilpatrick Townsend & Stockton LLP

(57) ABSTRACT

Methods and apparatus are provided for transferring data between servers and a remote entity having multiple peripherals. Multiple servers are connected to a remote entity over an Remote Direct Memory Access capable network. The remote entity includes peripherals such as network interface cards (NICs) and host bus adapters (HBAs). Server descriptor rings and descriptors are provided to allow efficient and effective communication between the servers and the remote entity.

13 Claims, 10 Drawing Sheets

(56) References Cited

U.S. PATENT DOCUMENTS

| | | | |
|---|---|---|---|
| 6,157,955 A | 12/2000 | Narad et al. | |
| 6,247,086 B1 | 6/2001 | Allingham | |
| 6,253,334 B1 | 6/2001 | Amdahl et al. | |
| 6,282,647 B1 | 8/2001 | Leung et al. | |
| 6,308,282 B1 | 10/2001 | Huang et al. | |
| 6,314,525 B1 | 11/2001 | Mahalingham et al. | |
| 6,331,983 B1 | 12/2001 | Haggerty et al. | |
| 6,343,324 B1 | 1/2002 | Hubis et al. | |
| 6,377,992 B1 | 4/2002 | Plaza et al. | |
| 6,393,483 B1 | 5/2002 | Latif et al. | |
| 6,401,117 B1 | 6/2002 | Narad et al. | |
| 6,418,494 B1 | 7/2002 | Shatas et al. | |
| 6,430,191 B1 | 8/2002 | Klausmeier et al. | |
| 6,466,993 B1 | 10/2002 | Bonola | |
| 6,470,397 B1 | 10/2002 | Shah et al. | |
| 6,578,128 B1 | 6/2003 | Arsenault et al. | |
| 6,594,329 B1 | 7/2003 | Susnow | |
| 6,628,608 B1 | 9/2003 | Lau et al. | |
| 6,708,297 B1 | 3/2004 | Bassel | |
| 6,725,388 B1 | 4/2004 | Susnow | |
| 6,757,725 B1 | 6/2004 | Frantz et al. | |
| 6,779,064 B2 | 8/2004 | McGowen et al. | |
| 6,804,257 B1 | 10/2004 | Benayoun et al. | |
| 6,807,581 B1 | 10/2004 | Starr et al. | |
| 6,823,458 B1 | 11/2004 | Lee et al. | |
| 6,898,670 B2 | 5/2005 | Nahum | |
| 6,931,511 B1 | 8/2005 | Weybrew et al. | |
| 6,937,574 B1 | 8/2005 | Delaney et al. | |
| 6,963,946 B1 | 11/2005 | Dwork et al. | |
| 6,970,921 B1 | 11/2005 | Wang et al. | |
| 7,011,845 B2 | 3/2006 | Kozbor et al. | |
| 7,046,668 B2 | 5/2006 | Pettey et al. | |
| 7,093,265 B1 | 8/2006 | Jantz et al. | |
| 7,096,308 B2 | 8/2006 | Main et al. | |
| 7,103,064 B2 | 9/2006 | Pettey et al. | |
| 7,103,888 B1 * | 9/2006 | Cayton et al. | 719/313 |
| 7,111,084 B2 | 9/2006 | Tan et al. | |
| 7,120,728 B2 | 10/2006 | Krakirian et al. | |
| 7,127,445 B2 | 10/2006 | Mogi et al. | |
| 7,143,227 B2 | 11/2006 | Maine | |
| 7,159,046 B2 | 1/2007 | Mulla et al. | |
| 7,171,434 B2 | 1/2007 | Ibrahim et al. | |
| 7,171,495 B2 * | 1/2007 | Matters et al. | 709/250 |
| 7,181,211 B1 | 2/2007 | Phan-Anh | |
| 7,188,209 B2 | 3/2007 | Pettey et al. | |
| 7,203,842 B2 | 4/2007 | Kean | |
| 7,209,439 B2 | 4/2007 | Rawlins et al. | |
| 7,213,246 B1 | 5/2007 | van Rietschote et al. | |
| 7,219,183 B2 | 5/2007 | Pettey et al. | |
| 7,240,098 B1 | 7/2007 | Mansee | |
| 7,260,661 B2 | 8/2007 | Bury et al. | |
| 7,269,168 B2 | 9/2007 | Roy et al. | |
| 7,281,030 B1 * | 10/2007 | Davis | 709/212 |
| 7,281,077 B2 | 10/2007 | Woodral | |
| 7,281,169 B2 | 10/2007 | Golasky et al. | |
| 7,307,948 B2 | 12/2007 | Infante et al. | |
| 7,308,551 B2 | 12/2007 | Arndt et al. | |
| 7,334,178 B1 | 2/2008 | Aulagnier | |
| 7,345,689 B2 | 3/2008 | Janus et al. | |
| 7,346,716 B2 | 3/2008 | Bogin et al. | |
| 7,360,017 B2 | 4/2008 | Higaki et al. | |
| 7,366,842 B1 | 4/2008 | Acocella et al. | |
| 7,386,637 B2 | 6/2008 | Arndt et al. | |
| 7,395,352 B1 | 7/2008 | Lam et al. | |
| 7,412,536 B2 | 8/2008 | Oliver et al. | |
| 7,421,710 B2 | 9/2008 | Qi et al. | |
| 7,424,529 B2 | 9/2008 | Hubis | |
| 7,433,300 B1 | 10/2008 | Bennett et al. | |
| 7,457,897 B1 | 11/2008 | Lee et al. | |
| 7,457,906 B2 | 11/2008 | Pettey et al. | |
| 7,493,416 B2 | 2/2009 | Pettey | |
| 7,502,884 B1 | 3/2009 | Shah et al. | |
| 7,509,436 B1 | 3/2009 | Rissmeyer | |
| 7,516,252 B2 | 4/2009 | Krithivas | |
| 7,602,774 B1 | 10/2009 | Sundaresan et al. | |
| 7,606,260 B2 | 10/2009 | Oguchi et al. | |
| 7,609,723 B2 | 10/2009 | Munguia | |
| 7,634,650 B1 | 12/2009 | Shah et al. | |
| 7,669,000 B2 | 2/2010 | Sharma et al. | |
| 7,711,789 B1 | 5/2010 | Jnagal et al. | |
| 7,733,890 B1 | 6/2010 | Droux et al. | |
| 7,782,869 B1 | 8/2010 | Chitlur Srinivasa | |
| 7,783,788 B1 | 8/2010 | Quinn et al. | |
| 7,792,923 B2 | 9/2010 | Kim | |
| 7,793,298 B2 | 9/2010 | Billau et al. | |
| 7,821,973 B2 | 10/2010 | McGee et al. | |
| 7,836,332 B2 | 11/2010 | Hara et al. | |
| 7,843,907 B1 | 11/2010 | Abou-Emara et al. | |
| 7,849,153 B2 | 12/2010 | Kim | |
| 7,865,626 B2 | 1/2011 | Hubis | |
| 7,870,225 B2 | 1/2011 | Kim | |
| 7,899,928 B1 | 3/2011 | Naik et al. | |
| 7,933,993 B1 | 4/2011 | Skinner | |
| 7,937,447 B1 | 5/2011 | Cohen et al. | |
| 7,941,814 B1 | 5/2011 | Okcu et al. | |
| 8,041,875 B1 | 10/2011 | Shah et al. | |
| 8,180,872 B1 | 5/2012 | Marinelli et al. | |
| 8,180,949 B1 | 5/2012 | Shah et al. | |
| 8,185,664 B1 | 5/2012 | Lok et al. | |
| 8,195,854 B1 | 6/2012 | Sihare | |
| 8,200,871 B2 | 6/2012 | Rangan et al. | |
| 8,218,538 B1 | 7/2012 | Chidambaram et al. | |
| 8,228,820 B2 | 7/2012 | Gopal Gowda et al. | |
| 8,261,068 B1 | 9/2012 | Raizen et al. | |
| 8,285,907 B2 | 10/2012 | Chappell et al. | |
| 8,291,148 B1 | 10/2012 | Shah et al. | |
| 8,387,044 B2 | 2/2013 | Yamada et al. | |
| 8,392,645 B2 | 3/2013 | Miyoshi | |
| 8,397,092 B2 | 3/2013 | Karnowski | |
| 8,443,119 B1 | 5/2013 | Limaye et al. | |
| 8,458,306 B1 | 6/2013 | Sripathi | |
| 8,677,023 B2 | 3/2014 | Vengataraghavan et al. | |
| 8,892,706 B1 | 11/2014 | Dalal | |
| 9,064,058 B2 | 6/2015 | Daniel | |
| 9,083,550 B2 | 7/2015 | Cohen et al. | |
| 9,264,384 B1 | 2/2016 | Sundaresan et al. | |
| 9,331,963 B2 | 5/2016 | Krishnamurthi et al. | |
| 2001/0032280 A1 | 10/2001 | Osakada et al. | |
| 2001/0037406 A1 | 11/2001 | Philbrick et al. | |
| 2002/0023151 A1 | 2/2002 | Iwatani | |
| 2002/0065984 A1 | 5/2002 | Thompson et al. | |
| 2002/0069245 A1 | 6/2002 | Kim | |
| 2002/0146448 A1 | 10/2002 | Kozbor et al. | |
| 2002/0152327 A1 * | 10/2002 | Kagan et al. | 709/250 |
| 2003/0007505 A1 | 1/2003 | Noda et al. | |
| 2003/0028716 A1 | 2/2003 | Sved | |
| 2003/0037177 A1 | 2/2003 | Sutton et al. | |
| 2003/0051076 A1 * | 3/2003 | Webber | 710/6 |
| 2003/0081612 A1 | 5/2003 | Goetzinger et al. | |
| 2003/0093501 A1 | 5/2003 | Carlson et al. | |
| 2003/0099254 A1 | 5/2003 | Richter | |
| 2003/0110364 A1 | 6/2003 | Tang et al. | |
| 2003/0118053 A1 | 6/2003 | Edsall et al. | |
| 2003/0126315 A1 | 7/2003 | Tan et al. | |
| 2003/0126320 A1 | 7/2003 | Liu et al. | |
| 2003/0126344 A1 | 7/2003 | Hodapp, Jr. | |
| 2003/0131182 A1 | 7/2003 | Kumar et al. | |
| 2003/0165140 A1 | 9/2003 | Tang et al. | |
| 2003/0172149 A1 | 9/2003 | Edsall et al. | |
| 2003/0200315 A1 * | 10/2003 | Goldenberg et al. | 709/225 |
| 2003/0208614 A1 | 11/2003 | Wilkes | |
| 2003/0212755 A1 | 11/2003 | Shatas et al. | |
| 2003/0226018 A1 * | 12/2003 | Tardo et al. | 713/168 |
| 2003/0229645 A1 | 12/2003 | Mogi et al. | |
| 2004/0003140 A1 | 1/2004 | Rimmer | |
| 2004/0003141 A1 | 1/2004 | Matters et al. | |
| 2004/0003154 A1 | 1/2004 | Harris et al. | |
| 2004/0008713 A1 | 1/2004 | Knight et al. | |
| 2004/0025166 A1 | 2/2004 | Adlung et al. | |
| 2004/0028063 A1 | 2/2004 | Roy et al. | |
| 2004/0030857 A1 | 2/2004 | Krakirian et al. | |
| 2004/0034718 A1 * | 2/2004 | Goldenberg et al. | 709/250 |
| 2004/0054776 A1 | 3/2004 | Klotz et al. | |
| 2004/0057441 A1 | 3/2004 | Li et al. | |

(56) References Cited

U.S. PATENT DOCUMENTS

| | | |
|---|---|---|
| 2004/0064590 A1 | 4/2004 | Starr et al. |
| 2004/0078632 A1 | 4/2004 | Infante et al. |
| 2004/0081145 A1 | 4/2004 | Harrekilde-Petersen et al. |
| 2004/0107300 A1 | 6/2004 | Padmanabhan et al. |
| 2004/0123013 A1 | 6/2004 | Clayton et al. |
| 2004/0139237 A1 | 7/2004 | Rangan et al. |
| 2004/0151188 A1 | 8/2004 | Maveli et al. |
| 2004/0160970 A1 | 8/2004 | Dally et al. |
| 2004/0172494 A1 | 9/2004 | Pettey et al. |
| 2004/0179529 A1 | 9/2004 | Pettey et al. |
| 2004/0210623 A1 | 10/2004 | Hydrie et al. |
| 2004/0218579 A1 | 11/2004 | An |
| 2004/0225719 A1 | 11/2004 | Kisley et al. |
| 2004/0225764 A1 | 11/2004 | Pooni et al. |
| 2004/0233933 A1 | 11/2004 | Munguia |
| 2004/0236877 A1 | 11/2004 | Burton |
| 2005/0010688 A1 | 1/2005 | Murakami et al. |
| 2005/0033878 A1 | 2/2005 | Pangal et al. |
| 2005/0039063 A1 | 2/2005 | Hsu et al. |
| 2005/0044301 A1 | 2/2005 | Vasilevsky et al. |
| 2005/0050191 A1 | 3/2005 | Hubis |
| 2005/0058085 A1 | 3/2005 | Shapiro et al. |
| 2005/0066045 A1 | 3/2005 | Johnson et al. |
| 2005/0080923 A1 | 4/2005 | Elzur |
| 2005/0080982 A1 | 4/2005 | Vasilevsky et al. |
| 2005/0091441 A1 | 4/2005 | Qi et al. |
| 2005/0108407 A1 | 5/2005 | Johnson et al. |
| 2005/0111483 A1 | 5/2005 | Cripe et al. |
| 2005/0114569 A1 | 5/2005 | Bogin et al. |
| 2005/0114595 A1 | 5/2005 | Karr et al. |
| 2005/0120160 A1 | 6/2005 | Plouffe et al. |
| 2005/0141425 A1 | 6/2005 | Foulds |
| 2005/0160251 A1 | 7/2005 | Zur et al. |
| 2005/0182853 A1 | 8/2005 | Lewites et al. |
| 2005/0188239 A1 | 8/2005 | Golasky et al. |
| 2005/0198410 A1* | 9/2005 | Kagan et al. ............... 710/22 |
| 2005/0198523 A1 | 9/2005 | Shanbhag et al. |
| 2005/0203908 A1 | 9/2005 | Lam et al. |
| 2005/0232285 A1 | 10/2005 | Terrell et al. |
| 2005/0238035 A1 | 10/2005 | Riley |
| 2005/0240621 A1 | 10/2005 | Robertson et al. |
| 2005/0240932 A1 | 10/2005 | Billau et al. |
| 2005/0262269 A1 | 11/2005 | Pike |
| 2006/0004983 A1 | 1/2006 | Tsao et al. |
| 2006/0007937 A1 | 1/2006 | Sharma |
| 2006/0010287 A1 | 1/2006 | Kim |
| 2006/0013240 A1 | 1/2006 | Ma et al. |
| 2006/0045089 A1 | 3/2006 | Bacher et al. |
| 2006/0045098 A1 | 3/2006 | Krause |
| 2006/0050693 A1 | 3/2006 | Bury et al. |
| 2006/0059400 A1 | 3/2006 | Clark et al. |
| 2006/0092928 A1 | 5/2006 | Pike et al. |
| 2006/0129699 A1* | 6/2006 | Kagan et al. ............... 709/250 |
| 2006/0136570 A1 | 6/2006 | Pandya |
| 2006/0168286 A1* | 7/2006 | Makhervaks et al. ........ 709/231 |
| 2006/0168306 A1* | 7/2006 | Makhervaks et al. ........ 709/232 |
| 2006/0179178 A1* | 8/2006 | King ............................. 710/22 |
| 2006/0182034 A1 | 8/2006 | Klinker et al. |
| 2006/0184711 A1 | 8/2006 | Pettey et al. |
| 2006/0193327 A1 | 8/2006 | Arndt et al. |
| 2006/0200584 A1 | 9/2006 | Bhat |
| 2006/0212608 A1 | 9/2006 | Arndt et al. |
| 2006/0224843 A1 | 10/2006 | Rao et al. |
| 2006/0233168 A1 | 10/2006 | Lewites et al. |
| 2006/0242332 A1* | 10/2006 | Johnsen et al. ............... 710/22 |
| 2006/0253619 A1* | 11/2006 | Torudbakken et al. ........ 710/31 |
| 2006/0282591 A1 | 12/2006 | Krithivas |
| 2006/0292292 A1 | 12/2006 | Brightman et al. |
| 2007/0011358 A1 | 1/2007 | Wiegert et al. |
| 2007/0050520 A1 | 3/2007 | Riley |
| 2007/0067435 A1 | 3/2007 | Landis et al. |
| 2007/0101173 A1 | 5/2007 | Fung |
| 2007/0112574 A1 | 5/2007 | Greene |
| 2007/0112963 A1 | 5/2007 | Dykes et al. |
| 2007/0130295 A1 | 6/2007 | Rastogi et al. |
| 2007/0220170 A1 | 9/2007 | Abjanic et al. |
| 2007/0286233 A1 | 12/2007 | Latif et al. |
| 2008/0025217 A1 | 1/2008 | Gusat et al. |
| 2008/0082696 A1 | 4/2008 | Bestler |
| 2008/0159260 A1 | 7/2008 | Vobbilisetty et al. |
| 2008/0192648 A1 | 8/2008 | Galles |
| 2008/0205409 A1 | 8/2008 | McGee et al. |
| 2008/0225877 A1 | 9/2008 | Yoshida |
| 2008/0270726 A1* | 10/2008 | Elnozahy et al. ............ 711/165 |
| 2008/0288627 A1 | 11/2008 | Hubis |
| 2008/0301692 A1 | 12/2008 | Billau et al. |
| 2008/0307150 A1 | 12/2008 | Stewart et al. |
| 2009/0070422 A1 | 3/2009 | Kashyap et al. |
| 2009/0106470 A1 | 4/2009 | Sharma et al. |
| 2009/0141728 A1 | 6/2009 | Brown et al. |
| 2009/0307388 A1 | 12/2009 | Tchapda |
| 2010/0088432 A1 | 4/2010 | Itoh |
| 2010/0138602 A1 | 6/2010 | Kim |
| 2010/0195549 A1 | 8/2010 | Aragon et al. |
| 2010/0232450 A1 | 9/2010 | Maveli et al. |
| 2010/0293552 A1 | 11/2010 | Allen et al. |
| 2011/0153715 A1 | 6/2011 | Oshins et al. |
| 2011/0154318 A1 | 6/2011 | Oshins et al. |
| 2012/0072564 A1 | 3/2012 | Johnsen |
| 2012/0079143 A1 | 3/2012 | Krishnamurthi et al. |
| 2012/0110385 A1 | 5/2012 | Fleming et al. |
| 2012/0144006 A1 | 6/2012 | Wakamatsu et al. |
| 2012/0158647 A1 | 6/2012 | Yadappanavar et al. |
| 2012/0163376 A1 | 6/2012 | Shukla et al. |
| 2012/0163391 A1 | 6/2012 | Shukla et al. |
| 2012/0166575 A1 | 6/2012 | Ogawa et al. |
| 2012/0167080 A1 | 6/2012 | Vilayannur et al. |
| 2012/0209905 A1 | 8/2012 | Haugh et al. |
| 2012/0239789 A1 | 9/2012 | Ando et al. |
| 2012/0304168 A1 | 11/2012 | Raj Seeniraj et al. |
| 2013/0031200 A1 | 1/2013 | Gulati et al. |
| 2013/0080610 A1 | 3/2013 | Ando |
| 2013/0117421 A1 | 5/2013 | Wimmer |
| 2013/0117485 A1 | 5/2013 | Varchavtchik et al. |
| 2013/0138836 A1 | 5/2013 | Cohen et al. |
| 2013/0145072 A1 | 6/2013 | Venkataraghavan et al. |
| 2013/0159637 A1 | 6/2013 | Forgette et al. |
| 2013/0179532 A1 | 7/2013 | Tameshige et al. |
| 2013/0201988 A1 | 8/2013 | Zhou et al. |
| 2014/0122675 A1 | 5/2014 | Cohen et al. |
| 2015/0134854 A1 | 5/2015 | Tchapda |

FOREIGN PATENT DOCUMENTS

| | | |
|---|---|---|
| EP | 2912805 A4 | 6/2016 |
| WO | 2014070445 | 5/2014 |

OTHER PUBLICATIONS

Office Action dated May 31, 2007, from U.S. Appl. No. 11/179,085.

Final Office Action dated Oct. 30, 2007, from U.S. Appl. No. 11/179,085.

Notice of Allowance dated Aug. 11, 2008, from U.S. Appl. No. 11/179,085.

Shah, et al., U.S. Appl. No. 12/250,842, titled "Resource Virtualization Switch," filed Oct. 14, 2008.

Office Action dated Aug. 10, 2010, from U.S. Appl. No. 12/250,842.

Notice of Allowance for Application No. dated Feb. 18, 2011.

Allowed Claims dated Feb. 18, 2011.

Figueiredo et al., "Resource Virtualization Renaissance," May 2005, IEEE Computer Society, pp. 28-31.

Ajay V. Bhatt, "Creating a Third generation I/O Interconnect," Intel ® Developer Network for PCI Express Architecture, www.expresslane.or, originally printed on Aug. 22, 2005, pp. 1-11.

U.S. Appl. No. 12/544,744, Non-Final Office Action dated Apr. 4, 2014, 30 pages.

U.S. Appl. No. 11/083,258, Final Office Action dated Apr. 18, 2014, 37 pages.

International Search Report and written Opinion of PCT/US2013/065008 dated Apr. 16, 2014, 17 pages.

Marshall, Xsigo Systems Launches Company and 1/0 Virtualization Product, vmblog.com, http:/lvmblog.com/archive/2007/09/15/

(56) References Cited

OTHER PUBLICATIONS xsigo-systems-launches-company-and-i-o-virtualization-product. aspx, accessed on Mar. 24, 2014, Sep. 15, 2007.
U.S. Appl. No. 11/083,258, Non-Final Office Action dated Sep. 10, 2014, 34 pages.
U.S. Appl. No. 12/544,744, Final Office Action dated Nov. 7, 2014, 32 pages.
U.S. Appl. No. 12/890,498, Advisory Action dated Apr. 16, 2012, 4 pages.
Wikipedia's article on 'Infiniband', Aug. 2010.
U.S. Appl. No. 11/083,258, Final Office Action dated Feb. 2, 2009, 13 pages.
U.S. Appl. No. 11/083,258, Final Office Action dated Jun. 10, 2010, 15 pages.
U.S. Appl. No. 11/083,258, Final Office Action dated Oct. 26, 2012, 30 pages.
U.S. Appl. No. 11/083,258, Non-Final Office Action dated Jul. 11, 2008, 12 pages.
U.S. Appl. No. 11/083,258, Non-Final Office Action dated Nov. 12, 2009, 13 pages.
U.S. Appl. No. 11/083,258, Non-Final Office Action dated Mar. 28, 2011, 14 pages.
U.S. Appl. No. 11/083,258, Non-Final Office Action dated Apr. 25, 2012, 30 pages.
U.S. Appl. No. 11/086,117, Final Office Action dated Dec. 23, 2008, 11 pages.
U.S. Appl. No. 11/086,117, Final Office Action dated Dec. 10, 2009, 18 pages.
U.S. Appl. No. 11/086,117, Non-Final Office Action dated May 6, 2009, 12 pages.
U.S. Appl. No. 11/086,117, Non-Final Office Action dated Jul. 22, 2008, 13 pages.
U.S. Appl. No. 11/086,117, Non-Final Office Action dated Jul. 22, 2010, 24 pages.
U.S. Appl. No. 11/086,117, Notice of Allowance dated Dec. 27, 2010, 15 pages.
U.S. Appl. No. 11/145,698, Final Office Action dated Aug. 18, 2009, 22 pages.
U.S. Appl. No. 11/145,698, Final Office Action dated Jul. 6, 2011, 26 pages.
U.S. Appl. No. 11/145,698, Non-Final Office Action dated May 9, 2013, 13 pages.
U.S. Appl. No. 11/145,698, Non-Final Office Action dated Mar. 31, 2009, 22 pages.
U.S. Appl. No. 11/145,698, Non-Final Office Action dated Mar. 16, 2011, 24 pages.
U.S. Appl. No. 11/179,085, Pre Appeal Brief Request dated Jan. 24, 2008, 6 pages.
U.S. Appl. No. 11/179,085, Preliminary Amendment dated May 27, 2008, 9 pages.
U.S. Appl. No. 11/179,085, filed Jul. 11, 2005.
U.S. Appl. No. 11/179,085, Response to Non-final Office Action filed on Aug. 10, 2007, 8 pages.
U.S. Appl. No. 11/179,437, Final Office Action dated Jan. 8, 2009, 13 pages.
U.S. Appl. No. 11/179,437, Non-Final Office Action dated May 8, 2008, 11 pages.
U.S. Appl. No. 11/179,437, Notice of Allowance dated Jun. 1, 2009, 8 pages.
U.S. Appl. No. 11/179,437, dated Jul. 11, 2005.
U.S. Appl. No. 11/184,306, Non-Final Office Action dated Apr. 10, 2009, 5 pages.
U.S. Appl. No. 11/184,306, Notice of Allowance dated Aug. 10, 2009, 4 pages.
U.S. Appl. No. 11/200,761, U.S. Patent Application dated Aug. 9, 2005, 32 pages.
U.S. Appl. No. 11/222,590, Non-Final Office Action dated Mar. 21, 2007, 6 pages.
U.S. Appl. No. 11/222,590, Notice of Allowance dated Sep. 18, 2007, 5 pages.
U.S. Appl. No. 12/250,842, Allowed Claims dated Jun. 10, 2011.
U.S. Appl. No. 12/250,842, Notice of Allowance dated Feb. 18, 2011, 5 pages.
U.S. Appl. No. 12/250,842, Notice of Allowance dated Jun. 10, 2011, 5 pages.
U.S. Appl. No. 12/250,842, Response to Non-Final Office Action filed on Nov. 19, 2010, 8 pages.
U.S. Appl. No. 12/544,744, Final Office Action dated Feb. 27, 2013, 27 pages.
U.S. Appl. No. 12/544,744, Non-Final Office Action dated Jun. 6, 2012, 26 pages.
U.S. Appl. No. 12/862,977, Non-Final Office Action dated Mar. 1, 2012, 8 pages.
U.S. Appl. No. 12/862,977, Non-Final Office Action dated Aug. 29, 2012, 9 pages.
U.S. Appl. No. 12/862,977, Notice of Allowance dated Feb. 7, 2013, 11 pages.
U.S. Appl. No. 12/890,498, Non-Final Office Action dated Nov. 13, 2011, 10 pages.
U.S. Appl. No. 12/890,498, Non-Final Office Action dated May 21, 2013, 22 pages.
U.S. Appl. No. 13/229,587, Non-Final Office Action dated Oct. 6, 2011, 4 pages.
U.S. Appl. No. 13/229,587, Notice of Allowance dated Jan. 19, 2012, 5 pages.
U.S. Appl. No. 13/229,587, Response to Non-Final Office Action filed on Jan. 4, 2012, 4 pages.
U.S. Appl. No. 13/445,570, Notice of Allowance dated Jun. 20, 2012, 5 pages.
Kesavan et al., Active CoordinaTion (ACT)—Toward Effectively Managing Virtualized Multicore Clouds, IEEE, 2008.
Poulton, Xsigo—Try it out, I dare you, Nov. 16, 2009.
Ranadive et al., IBMon: Monitoring VMM-Bypass Capable InfiniBand Devices using Memory Introspection, ACM, 2009.
Wong et al., Effective Generation of Test Sequences for Structural Testing of Concurrent Programs, IEEE International Conference of Complex Computer Systems (ICECCS'05), 2005.
Xu et al., Performance Virtualization for Large-Scale Storage Systems, IEEE, 2003, 10 pages.
U.S. Appl. No. 11/179,085, Non-Final Office Action dated May 31, 2007, 14 pages.
U.S. Appl. No. 11/179,085, Final Office Action dated Oct. 30, 2007, 13 pages.
U.S. Appl. No. 11/179,085, Notice of Allowance dated Aug. 11, 2008, 4 pages.
U.S. Appl. No. 11/083,258, Advisory Action dated Jan. 24, 2013, 3 pages.
U.S. Appl. No. 12/250,842, Non-Final Office Action dated Aug. 10, 2010, 9 pages.
U.S. Appl. No. 12/250,842, filed Oct. 14, 2008.
U.S. Appl. No. 11/083,258, Non-Final Office Action dated Sep. 18, 2013, 35 pages.
U.S. Appl. No. 11/145,698, Notice of Allowance dated Oct. 24, 2013, 15 pages.
U.S. Appl. No. 12/890,498, Final Office Action dated Feb. 7, 2012, 9 pages.
HTTP Persistent Connection Establishment, Management and Termination, section of 'The TCP/IP Guide' version 3.0, Sep. 20, 2005, 2 pages.
TCP Segment Retransmission Timers and the Retransmission Queue, section of 'The TCP/IP Guide' version 3.0, Sep. 20, 2005, 3 pages.
TCP Window Size Adjustment and Flow Control, section of 'The TCP/IP Guide' version 3.0, Sep. 20, 2005, 2 pages.
Balakrishnan et al., Improving TCP/IP Performance over Wireless Networks, Proc. 1st ACM Int'l Conf. on Mobile Computing and Networking (Mobicom), Nov. 1995, 10 pages.
U.S. Appl. No. 12/890,498, Final Office Action dated Jun. 17, 2015, 24 pages.
U.S. Appl. No. 11/083,258, Final Office Action dated Mar. 19, 2015, 37 pages.
U.S. Appl. No. 13/663,405, Notice of Allowance dated Mar. 12, 2015, 13 pages.

(56) References Cited

OTHER PUBLICATIONS

U.S. Appl. No. 12/890,498, Advisory Action dated Jan. 27, 2015, 3 pages.
U.S. Appl. No. 12/890,498, Final Office Action dated Nov. 19, 2014, 21 pages.
U.S. Appl. No. 12/890,498, Non-Final Office Action dated Mar. 5, 2015, 24 pages.
U.S. Appl. No. 13/663,405, Non-Final Office Action dated Nov. 21, 2014, 19 pages.
Spanbauer, Wired or Wireless, Choose Your Network, PCWorld, Sep. 30, 2003, 9 pages.
U.S. Appl. No. 12/544,744, Non-Final Office Action dated Sep. 24, 2015, 29 pages.
U.S. Appl. No. 12/890,498, Advisory Action dated Aug. 25, 2015, 3 pages.
European Application No. 13850840.3, Extended European Search Report dated May 3, 2016, 6 pages.
International Application No. PCT/US2013/065008, International Preliminary Report on Patentability dated May 14, 2015, 6 pages.
U.S. Appl. No. 12/544,744, Final Office Action dated Jun. 1, 2016, 34 pages.
U.S. Appl. No. 12/890,498, Supplemental Notice of Allowability dated Jan. 14, 2016, 2 pages.
U.S. Appl. No. 11/083,258, Corrected Notice of Allowability dated Oct. 15, 2015, 5 pages.
U.S. Appl. No. 11/083,258, Notice of Allowance dated Oct. 5, 2015, 8 pages.
U.S. Appl. No. 12/890,498, Notice of Allowance dated Dec. 30, 2015, all pages.
U.S. Appl. No. 11/086,117, dated Jul. 22, 2008, Non-Final Office Action.
U.S. Appl. No. 11/086,117, dated Dec. 23, 2008, Final Office Action.
U.S. Appl. No. 11/086,117, dated May 6, 2009, Non-Final Office Action.
U.S. Appl. No. 11/086,117, dated Dec. 10, 2009, Final Office Action.
U.S. Appl. No. 11/086,117, dated Jul. 22, 2010, Non-Final Office Action.
U.S. Appl. No. 11/086,117, dated Dec. 27, 2010, Notice of Allowance.
U.S. Appl. No. 11/145,698, dated Mar. 31, 2009, Non-Final Office Action.
U.S. Appl. No. 11/145,698, dated Aug. 18, 2009, Final Office Action.
U.S. Appl. No. 11/145,698, dated Mar. 16, 2011, Non-Final Office Action.
U.S. Appl. No. 11/145,698, dated Jul. 6, 2011, Final Office Action.
U.S. Appl. No. 11/145,698, dated May 9, 2013, Non-Final Office Action.
U.S. Appl. No. 11/145,698, dated Oct. 24, 2013, Notice of Allowance.
U.S. Appl. No. 11/179,085, dated May 31, 2007, Non-Final Office Action.
U.S. Appl. No. 11/179,085, dated Oct. 30, 2007, Final Office Action.
U.S. Appl. No. 11/179,085, dated Jan. 24, 2008, Pre Appeal Brief Request.
U.S. Appl. No. 11/179,085, dated May 27, 2008, Preliminary Amendment.
U.S. Appl. No. 11/179,085, dated Aug. 11, 2008, Notice of Allowance.
U.S. Appl. No. 11/179,437, dated May 8, 2008, Non-Final Office Action.
U.S. Appl. No. 11/179,437, dated Jan. 8, 2009, Final Office Action.
U.S. Appl. No. 11/179,437, dated Jun. 1, 2009, Notice of Allowance.
U.S. Appl. No. 11/184,306, dated Apr. 10, 2009, Non-Final Office Action.
U.S. Appl. No. 11/184,306, dated Aug. 10, 2009, Notice of Allowance.
U.S. Appl. No. 11/083,258, dated Jul. 11, 2008, Non-Final Office Action.
U.S. Appl. No. 11/083,258, dated Feb. 2, 2009, Final Office Action.
U.S. Appl. No. 11/083,258, dated Nov. 12, 2009, Non-Final Office Action.
U.S. Appl. No. 11/083,258, dated Jun. 10, 2010, Final Office Action.
U.S. Appl. No. 11/083,258, dated Mar. 28, 2011, Non-Final Office Action.
U.S. Appl. No. 11/083,258, dated Apr. 25, 2012, Non-Final Office Action.
U.S. Appl. No. 11/083,258, dated Oct. 26, 2012, Final Office Action.
U.S. Appl. No. 11/083,258, dated Jan. 24, 2013, Advisory Action.
U.S. Appl. No. 11/083,258, dated Sep. 18, 2013, Non-Final Office Action.
U.S. Appl. No. 11/083,258, dated Apr. 18, 2014, Final Office Action.
U.S. Appl. No. 11/083,258, dated Sep. 10, 2014, Non-Final Office Action.
U.S. Appl. No. 11/083,258, dated Mar. 19, 2015, Final Office Action.
U.S. Appl. No. 11/083,258, dated Oct. 5, 2015, Notice of Allowance.
U.S. Appl. No. 11/083,258, dated Oct. 15, 2015, Notice of Allowability.
U.S. Appl. No. 11/222,590, dated Mar. 21, 2007, Non-Final Office Action.
U.S. Appl. No. 11/222,590, dated Sep. 18, 2007, Notice of Allowance.
U.S. Appl. No. 12/250,842, dated Aug. 10, 2010, Non-Final Office Action.
U.S. Appl. No. 12/250,842, dated Aug. 18, 2011, Notice of Allowance.
U.S. Appl. No. 12/250,842, dated Jun. 10, 2011, Notice of Allowance.
U.S. Appl. No. 12/250,842, dated Jun. 10, 2011, Allowed Claims.
U.S. Appl. No. 12/544,744, dated Jun. 6, 2012, Non-Final Office Action.
U.S. Appl. No. 12/544,744, dated Feb. 27, 2013, Final Office Action.
U.S. Appl. No. 12/544,744, dated Apr. 4, 2014, Non-Final Office Action.
U.S. Appl. No. 12/544,744, dated Nov. 7, 2014, Final Office Action.
U.S. Appl. No. 12/544,744, dated Sep. 24, 2015, Non-Final Office Action.
U.S. Appl. No. 12/862,977, dated Mar. 1, 2012, Non-Final Office Action.
U.S. Appl. No. 12/862,977, dated Aug. 29, 2012, Non-Final Office Action.
U.S. Appl. No. 12/862,977, dated Feb. 7, 2013, Notice of Allowance.
U.S. Appl. No. 12/890,498, dated Nov. 13, 2011, Non-Final Office Action.
U.S. Appl. No. 12/890,498, dated Feb. 7, 2012, Final Office Action.
U.S. Appl. No. 12/890,498, dated May 21, 2013, Non-Final Office Action.
U.S. Appl. No. 12/890,498, dated Apr. 16, 2014, Advisory Action.
U.S. Appl. No. 12/890,498, dated Jan. 27, 2015, Advisory Action.
U.S. Appl. No. 12/890,498, dated Nov. 19, 2014, Final Office Action.
U.S. Appl. No. 12/890,498, dated Mar. 5, 2015, Non-Final Office Action.
U.S. Appl. No. 12/890,498, dated Jun. 17, 2015, Final Office Action.
U.S. Appl. No. 12/890,498, dated Aug. 25, 2015, Advisory Action.
U.S. Appl. No. 12/890,498, dated Dec. 30, 2015, Notice of Allowance.
U.S. Appl. No. 13/229,587, dated Oct. 6, 2011, Non-Final Office Action.
U.S. Appl. No. 13/229,587, dated Jan. 19, 2012, Notice of Allowance.
U.S. Appl. No. 13/445,570, dated Jun. 20, 2012, Notice of Allowance.
U.S. Appl. No. 13/663,405, dated Nov. 21, 2014, Non-Final Office Action.

(56) References Cited

OTHER PUBLICATIONS

U.S. Appl. No. 13/663,405, dated Mar. 12, 2015, Notice of Allowance.

* cited by examiner

Figure 3
Server Descriptor Ring 303
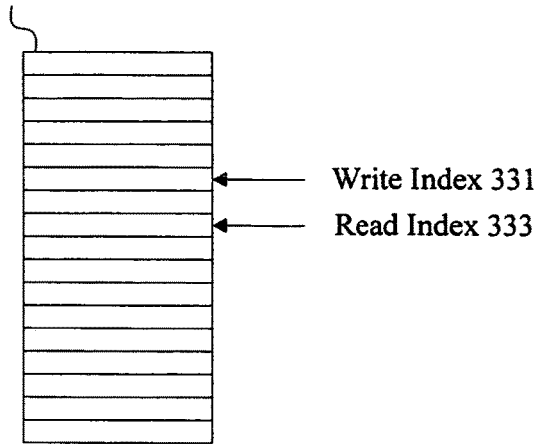
← Write Index 331
← Read Index 333
Server Descriptor Ring 313
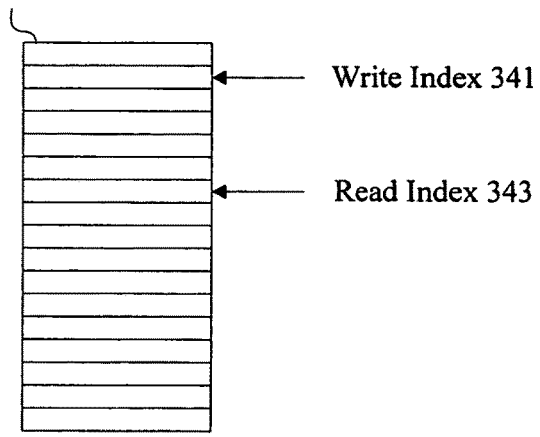
← Write Index 341
← Read Index 343
Server Descriptor Ring 323
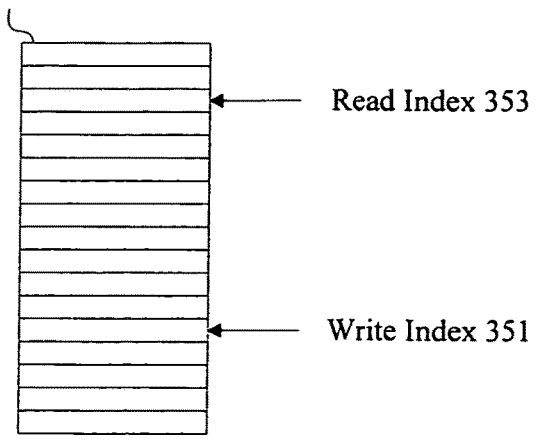
← Read Index 353
← Write Index 351

Figure 7

| Type 703 | Entry Size 705 | Ring Size 707 |
|---|---|---|
| | Reserved 709 | |
| | Read Index Address R_Key 711 | |
| | Base Address R_Key 713 | |
| | Read Index Address Hi (bits 63-32) 715 | |
| | Read Index Address Lo (bits 31-0) 717 | |
| | Base Address Hi (bits 63-32) 719 | |
| | Base Address Lo (bits 31-0) 721 | |

| Type 801 | Read Index 803 | Completion Count 805 |
|---|---|---|
| | Reserved 807 | |
| | Completion Entry 809 | |
| | ... | |
| | Completion Entry 811 | |

| Command Handle 821 | Packet Length 823 |
|---|---|
| Status 825 | Reserved 827 |

EFFICIENT DATA TRANSFER BETWEEN SERVERS AND REMOTE PERIPHERALS

BACKGROUND OF THE INVENTION

1. Field of the Invention

The present invention relates data transfer between servers and remote entities including remote peripherals. In one example, the present invention relates to methods and apparatus for efficiently transferring data between servers and remote peripherals such as network interface cards (NICs), host bus adapters (HBAs), and cryptographic accelerators.

2. Description of Related Art

A server or computing system generally includes one or more processors, memory, and peripheral components and peripheral interfaces. Examples of peripheral components include cryptographic accelerators, graphics accelerators, and eXtensible Markup Language (XML) accelerators. Examples of peripheral interfaces include network interface cards (NIC), serial ATA (SATA) adapters, and host bus adapters (HBA). Processors, memory, and peripherals are often connected using one or more buses and bus bridges. To provide fault-tolerance, individual servers are often configured with redundant resources.

Because resources such as peripheral components and peripheral interfaces are assigned on a per server or a per processor basis, other servers do not typically have access to these resources. In order to provide adequate resources for each server, resources are typically over-provisioned. For example, more hardware acceleration is provided than is typically needed. More network interface bandwidth is allocated than is typically used simply to handle worst-case or expected worst-case scenarios. Resources are over-provisioned resulting in overall waste and low utilization. Resource assignment on a per server or a per processor basis also limits the ability to reconstruct or reconfigure a resource environment.

A variety of peripherals are sometimes provided remotely over a network. However, protocols for communications between servers and remote peripherals are often inefficient, inadequate, or even unavailable. Consequently, the techniques and mechanisms of the present invention allow efficient data transfer between servers and remote peripherals over a networking technology.

SUMMARY OF THE INVENTION

Methods and apparatus are provided for transferring data between servers and a remote entity having multiple peripherals. Multiple servers are connected to a remote entity over an Remote Direct Memory Access capable network. The remote entity includes peripherals such as network interface cards (NICs) and host bus adapters (HBAs). Server descriptor rings and descriptors are provided to allow efficient and effective communication between the servers and the remote entity.

In one embodiment a technique for transferring data from a server to a remote entity is provided. A write index is sent to virtualization logic associated with the remote entity. The remote entity includes multiple peripheral interfaces. The write index is provided from the server to virtualization logic over an RDMA capable networking technology. One or more server descriptor entries are provided to virtualization logic. An RDMA read data buffer request is received from virtualization logic. Data is transferred in response to the RDMA read data buffer request.

In another example, a technique for transferring data from a remote peripheral to a server is provided. A write index is sent to virtualization logic associated with a remote entity including multiple peripherals. The write index is provided from the server to virtualization logic over an RDMA capable networking technology. A server descriptor entry referenced by the write index is provided to virtualization logic. An RDMA write response buffer is received from virtualization logic. A completion message is received from virtualization logic.

A further understanding of the nature and advantages of the present invention may be realized by reference to the remaining portions of the specification and the drawings.

BRIEF DESCRIPTION OF THE DRAWINGS

The invention may best be understood by reference to the following description taken in conjunction with the accompanying drawings, which are illustrative of specific embodiments of the present invention.

FIG. 3 is a diagrammatic representation depicting server descriptor rings.

FIG. 7 is a diagrammatic representation showing an initialization descriptor.

FIG. 8 is a diagrammatic representation depicting a completion descriptor.

DETAILED DESCRIPTION OF SPECIFIC EMBODIMENTS

Figure 1:
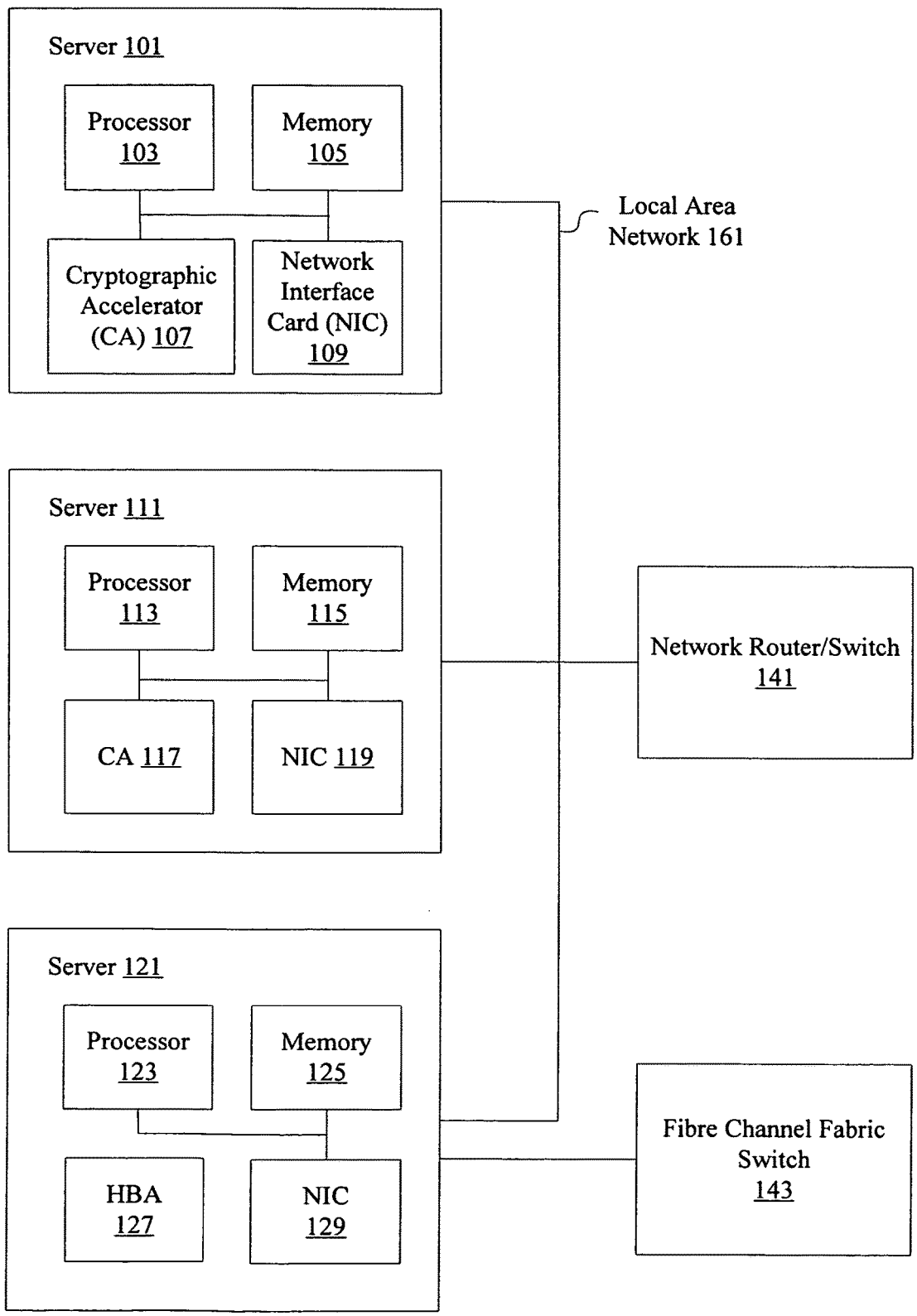
FIG. 1 is a diagrammatic representation showing individual servers.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of RDMA and Infiniband as one example of an RDMA capable network. However, it should be noted that the techniques of the present invention can be applied to a variety of different standards and variations to RDMA and Infiniband. Similarly, a server is described throughout. However, a server can be a single processing system, a multiple processor system, a guest operating system, a system image, or a virtual machine. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Furthermore, techniques and mechanisms of the present invention will sometimes be described in singular form for clarity. However, it should be noted that some embodiments include multiple iterations of a technique or multiple instantiations of a mechanism unless noted otherwise. For example, a processor is used in a variety of contexts. However, it will be appreciated that multiple processors can also be used while remaining within the scope of the present invention unless otherwise noted.

Servers having processors and memory typically have access to physical peripherals, including peripheral components and peripheral interfaces. However, physically tying resources to particular servers can lead to a number of drawbacks, including management and usage inefficiencies. In some examples, peripherals are moved from individual servers onto a remote device. In some embodiments, resources such as hardware accelerators, NICs, and HBAs are removed from individual servers and aggregated at a remote entity. The remote entity can be configured to include multiple peripherals and virtualization logic allowing server access to the peripherals.

In some examples, the remote entity is an appliance or switch that is connected to multiple servers over a network. However, offloading resources onto a remote entity requires that the servers be able to access the resources in an efficient manner. Typical networks do not allow efficient access to the resources in a manner providing low-latency, high-throughput, processor efficiency, support for quality of service (QoS). Consequently, the techniques and mechanisms of the present invention contemplate providing efficient access to remote peripherals including remote storage adapters, remote network adapters, and remote hardware accelerators. In one example, the remote entity receives requests from individual servers over an remote direct memory access (RDMA) capable network such as Infiniband and provides resources to handle individual requests.

Examples of RDMA capable networks include Infiniband and RDMA over Ethernet. The RDMA capable network provides a low latency, high bandwidth connection between the multiple servers and the resources in the remote entity. The technique takes into account the fact that the RDMA-capable network adapter within each server may have different performance characteristics than the specialized device that resides on the I/O entity. According to various embodiments, a higher processing burden is placed on the target device within the remote entity rather than on the RDMA network adapter within each server. This improves performance and reduces the overhead imposed on the computer and its RDMA network adapter.

According to various embodiments, an RDMA network adapter on a server has a large set of capabilities, but is limited because of the need to support a variety of protocols. The RDMA adapters on the remote entity, however, can be configured to be much more specialized. Each remote entity RDMA adapter does not need to support all host functionality. In some examples, each remote entity RDMA adapter only needs to support a particular data transfer protocol. However, the remote entity RDMA adapter needs to support high bandwidth and low latency, as a remote entity RDMA adapter may be configured to support many server adapters at the same time. According to various embodiments, the techniques of the present invention place processing burden on the remote entity adapter and not on the server. RDMAs are issued by the remote entity adapter and not by the server adapter.

Various embodiments of the present invention provide a unified infrastructure for supporting storage, network, and other types of remote input/output (I/O) traffic. Message coalescing is used to improve performance by reducing the number of messages. Support for QoS is maintained and the techniques are suitable for either hardware or software implementation. According to various embodiments, the remote entity allows dynamic reconfiguration and remapping of virtual resources to servers to support true stateless computing and utility computing and allows charge back by application, user, departments, etc. Storage resources including local disks can be shared and virtualized to allow stateless computing.

Requests from multiple servers may also be forwarded to the same NIC. An administrator can provision and partition resources including server resources, peripheral component resources, and peripheral interface resources at the remote entity based on particular needs and requirements. According to various embodiments, a remote entity can also perform packet inspection or deep packet inspection to classify server traffic. Traffic policies can be applied to allow application level quality of service. Quality of service (QOS) and traffic engineering schemes can be implemented. Traffic associated with particular devices or servers can be given priority or guaranteed bandwidth. The total amount of resources can be decreased while increasing resource utilization. The remote entity can be introduced into existing server racks and farms with little disruption to system operation.

FIG. 1 is a diagrammatic representation showing a typical system for connecting servers to an IP network. Server 101 includes a processor 103, memory 105, a cryptographic accelerator 107, and NIC 109. The processor 103 communicates with other components and interfaces in the system using a network and associated I/O controllers. One or more bus bridges may also be used. In typical implementations, communications between components and interfaces in server 101 occur over a network such as Infiniband. Server 111 includes processor 113, cryptographic accelerator 117, memory 115, and NIC 119. Communication within server 111 similarly occurs over one or more I/O buses. Server 121 includes a processor 123, memory 125, HBA 127 and NIC 129. In order to allow communication with an IP network through a local area network and through network router 141, NICs 109, 119, and 129 are provided. To allow communication with a fibre channel storage area network through fibre channel switch 143, an HBA 127 is provided. In one example, a processor 103 passes data to a cryptographic accelerator 117 to encrypt data prior to transmitting the data onto the local area network 161. Similarly, data received from a NIC 109 is passed to a cryptographic accelerator 117 for decryption when data is received by the processor 103.

The various NICs 107, 119, and 129 are also associated with IP addresses and media access control (MAC) addresses. Each server and associated NIC encapsulates data into IP packets for transmission to a network router 141. Encapsulation may involve adding appropriate Telnet Control Protocol (TCP) and IP headers and addresses. Each NIC is also configured to remove TCP/IP headers and addresses and provide data to an associated processor over a system bus when IP packets are received from an IP network. An HBA 127 may be configured to perform fabric login (FLOGI) and port login (PLOGI) processes associated with operating in a fibre channel storage area network. Each server 101, 111, and 121 may be individual computers, UNIX based low-end to high-end servers, mainframes, or blade servers. Any system including a processor and memory and an address space is referred to herein as a server. A server may include components noted above as well as a variety of other components.

In some examples, a series of servers each include a processor and a number of resources such as HBAs, NICs, iSCSI TOE, SATA as well as other peripherals interfaces and peripheral components. Cables and lines are then connected to each server to allow access to Ethernet switches, Fibre Channel switches, appliances, and mainframe or KVM switches. In some examples, redundant cables are used to connect each server to each switch. In an example with 40 servers, 80 cables would be used to connect the servers to an Ethernet switch. An additional 80 cables would be used to connect the servers to Fibre Channel switch, etc. The resource allocation and system management inefficiencies are magnified by the physical complexities of routing the individual cables.

Figure 2:
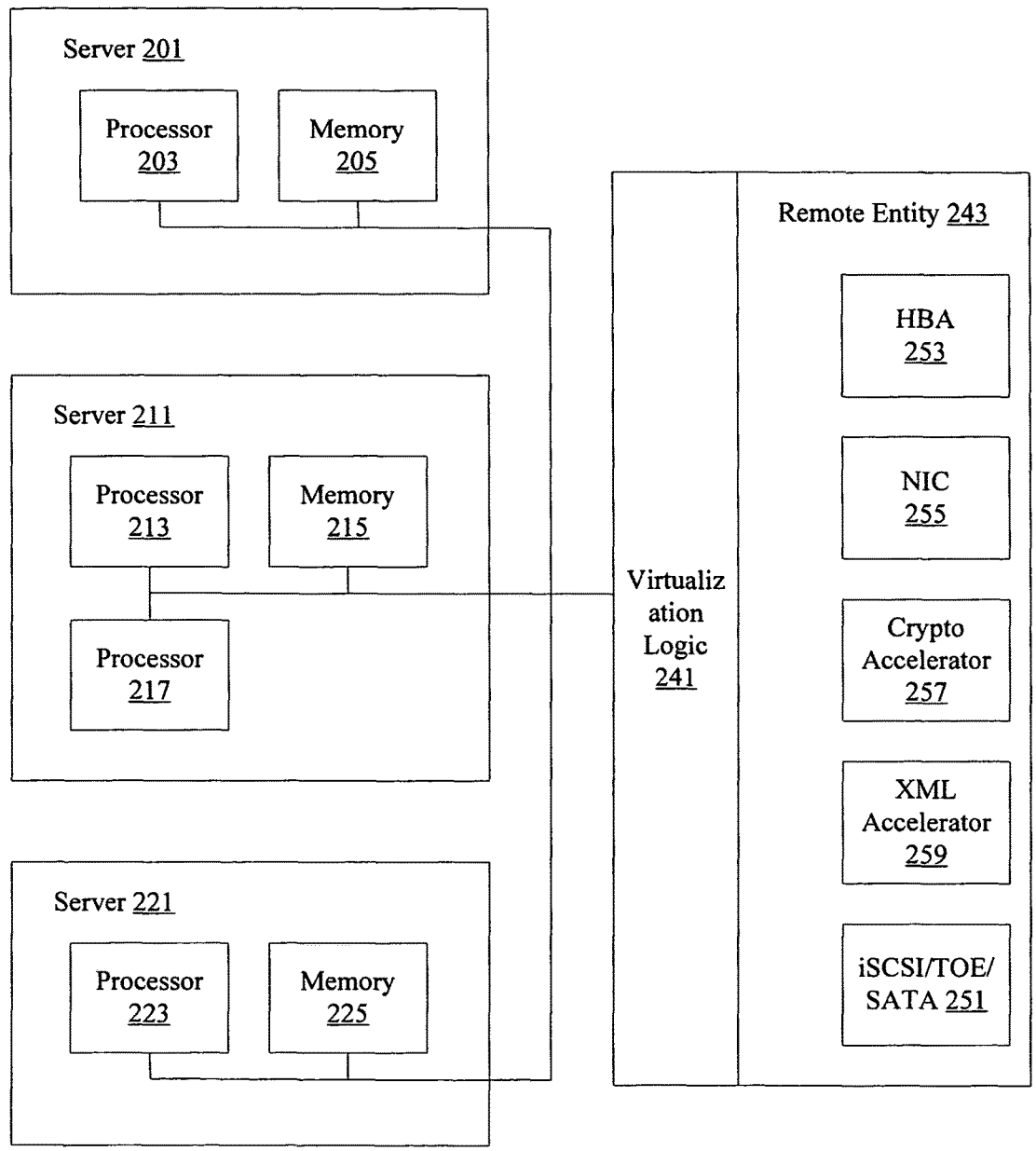
FIG. 2 is a diagrammatic representation showing individual servers connected to remote peripherals.

FIG. 2 is a diagrammatic representation showing separate servers connected to a remote entity. Server 201 includes processor 203 and memory 205. Server 211 includes processors 213 and 217 and memory 215. Server 221 includes only processor 223 and memory 225. Components and peripherals in each server 201, 211, and 221 are connected using one or more I/O buses. It should be noted that a server can be a virtual server such as a guest operating system, an application, or a virtual machine. According to various embodiments, an RDMA capable network is used to allow access to a remote entity 243. Each server is configured to communicate with a remote entity 243 using virtualization logic 241.

Virtualization logic 241 may be a standalone entity, integrated within a particular server, or provided with a remote entity 243. According to various embodiments, components such as HBA 253, NIC 255, a cryptographic accelerator 257, an XML accelerator 259, Internet SCSI (iSCSI)/TCP Offload Engine (TOE)/Serial ATA (SATA) 251, can be offloaded from servers 201, 211, and 221 onto a remote entity 243. The resources including HBA 253, NIC 255, cryptographic accelerator 257, XML accelerator 259, and iSCSI/TOE/SATA 251 are maintained in a shared and virtualized manner on a remote entity 243. Links are provided between the remote entity and external switches/routers such as an IP network switch/router.

According to various embodiments, a series of servers is connected to the remote entity using an Infiniband network. Infiniband allows interconnection of processing nodes and I/O nodes. The Infiniband stack includes support of multiple queues including send and receive queues. In one example, the queues used are descriptor rings. Descriptors are used to hold instructions, commands, and data addresses. For example, descriptors hold instructions to transmit data and receive data.

By using a remote entity, the number of resources and links can be significantly reduced while increasing allocation efficiency. Resources can be accessed at the driver level. Virtual resources including service engines can be dynamically bound to servers including system images, guest operating systems, and virtual machines. In one instance, a cryptographic accelerator is bound to a particular system image.

In this example, to perform cryptographic operations associated with sending or receiving data, a server 201 passes data to the remote entity cryptographic accelerator 257 as though the remote entity cryptographic accelerator 257 were included in the server 201. To perform XML operations, a server 201 passes data to the XML accelerator 259 as though the XML accelerator 259 is included in the server 201. Alternatively, XML and cryptographic operations can be performed as data is received at a remote entity from a network. Consequently, additional server 201 processor involvement is not needed.

FIG. 3 is a diagrammatic representation showing descriptor rings that can be used for communication between servers and a remote entity over an Infiniband network. According to various embodiments, each server may include one or more descriptor rings. Each server descriptor 303, 313, and 323 is associated with a write index and a read index. Server descriptor 303 has a write index 331 and a read index 333. The write index 331 is modified by the server and is associated with the descriptor the server 303 has last written. The read index 333 is modified by virtualization logic and associated peripheral components and peripheral interfaces. The read index 333 is associated with the descriptor the virtualization logic has last read.

Similarly, descriptor ring 313 has write index 341 and read index 343 and descriptor ring 323 has read index 353 and write index 351. In one embodiment, the server descriptor rings 303, 313, and 323 are associated with different servers. Each server descriptor ring may also have an associated ring size value and a base address value.

Figure 4:
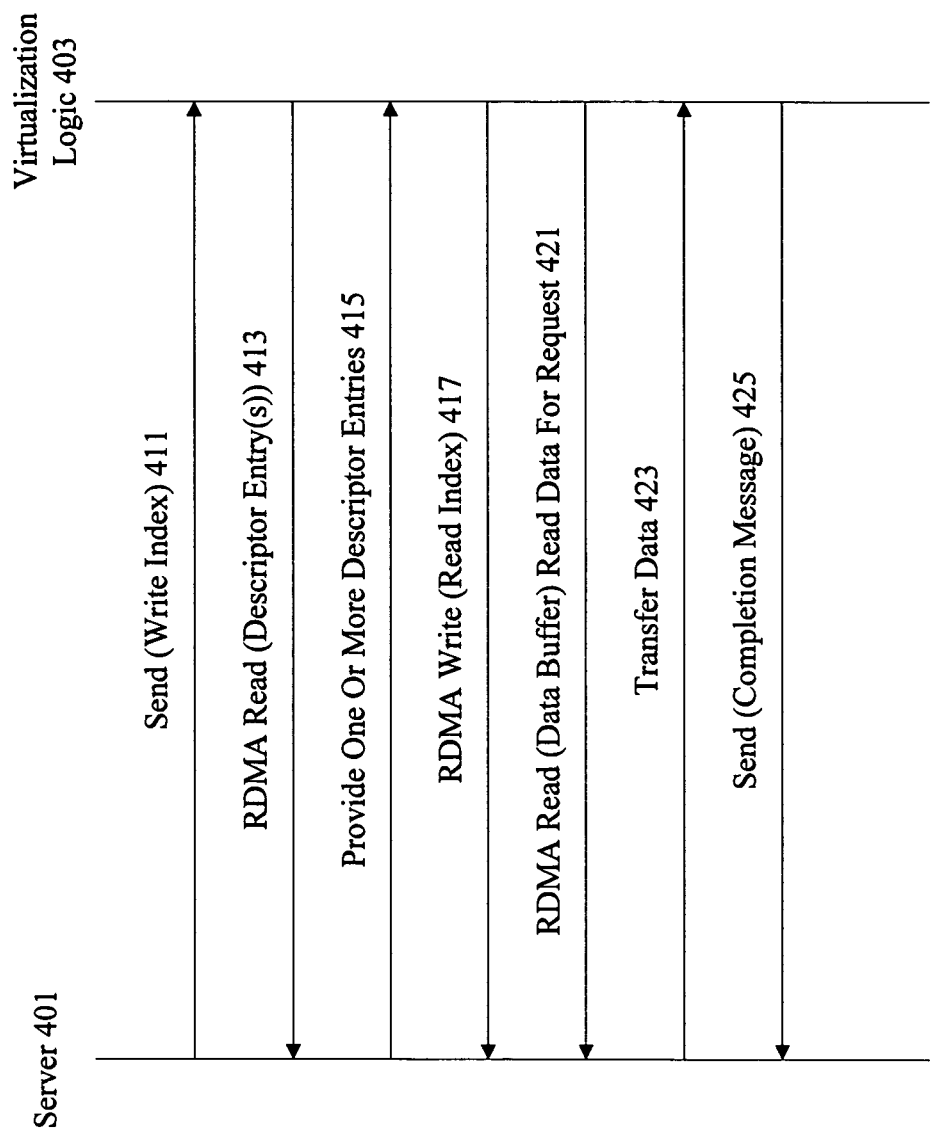
FIG. 4 is an exchange diagram showing data transmission from a server.

FIG. 4 is an exchange diagram showing one technique for transmitting data from a server to a remote entity having multiple resources to allow access to a peripheral such as a port adapter. In one example, a server may be transmitting data onto a network through a NIC provided at a remote entity. A server 401 communicates with virtualization logic 403 associated with remote peripherals. The server 401 sends a write index 411 to the virtualization logic 403. In response to the write index, the virtualization logic 403 sends an RDMA read to the server 401. The server 401 provides one or more descriptor entries to the virtualization logic 403. A wide variety of descriptor formats are available. In many embodiments, a descriptor includes a pointer or memory address. The number of bytes in the buffer or memory may also be provided. A start of memory, middle of memory, or end of memory indicator can also provided in the event that the data block is fragmented.

The virtualization logic 403 sends an optional RDMA write to provide a read index 417 to the server 401. The virtualization logic 403 processes the descriptor information and sends an RDMA read data buffer request 421 to the server 401. One or more address ranges may be read. The server provides the data 423 to the virtualization logic 403. When the data has been received the virtualization logic 403 responds with a completion message 425.

Figure 5:
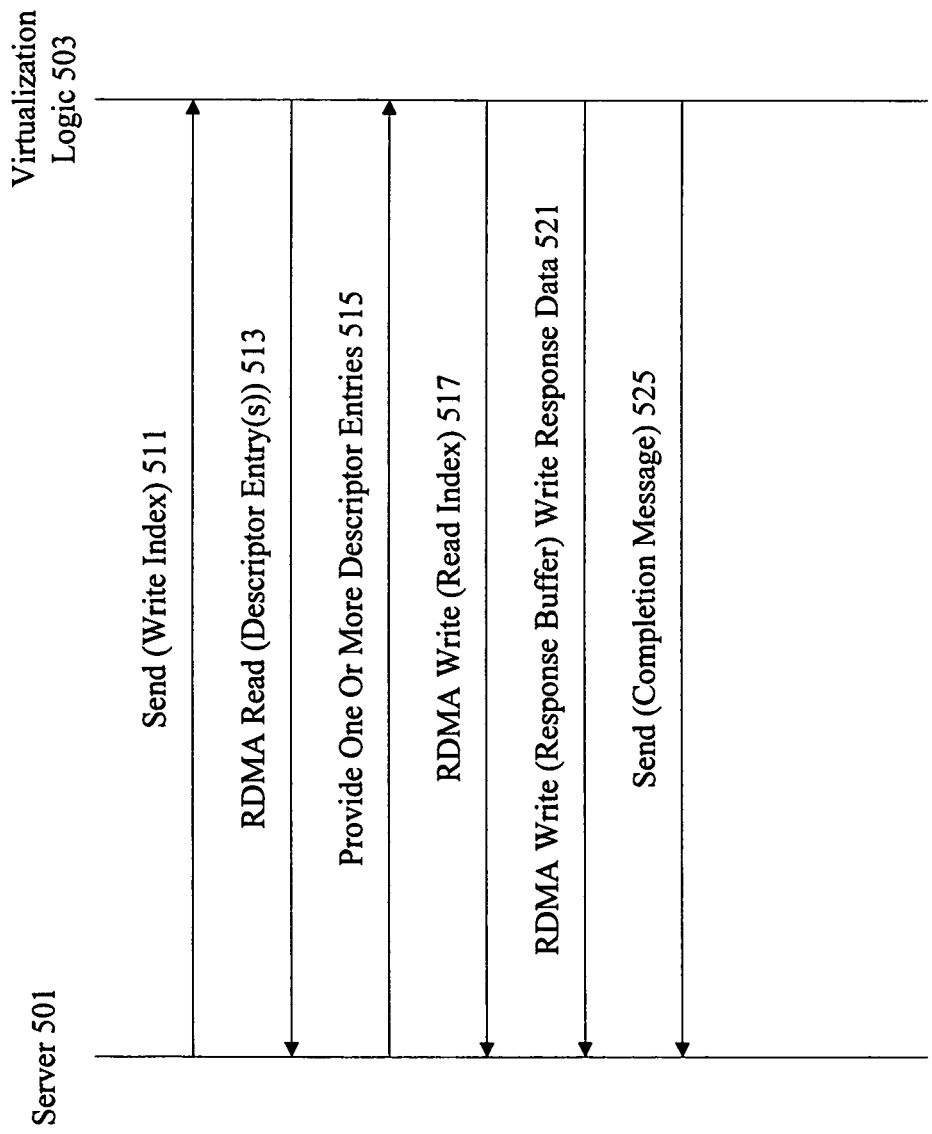
FIG. 5 is an exchange diagram showing data transmission to a server.

FIG. 5 is an exchange diagram showing one technique for receiving data from a remote entity having multiple resources to allow a server to access a peripheral such as a port adapter. In one example, a server may be receiving network data received by a NIC at a remote entity. A server 501 communicates with virtualization logic 503 associated with remote peripherals. The server 501 sends a write index 511 to the virtualization logic 503. In response to the write index, the virtualization logic 503 sends an RDMA read to the server 501. The server 501 provides one or more descriptor entries to the virtualization logic 503. A wide variety of descriptor formats are available. In many embodiments, a descriptor includes a pointer or memory address. The number of bytes in the buffer or memory may also be provided. A start of memory, middle of memory, or end of memory indicator can also provided in the event that the data block is fragmented.

The virtualization logic 503 sends an optional RDMA write to provide a read index 517 to the server 501. The virtualization logic 503 processes the descriptor information and sends an RDMA write to the server with write response data 521. According to various embodiments, data is written directly into server memory at addresses specified by descriptor entries. One or more address ranges may be written. The virtualization logic 503 sends a completion message 523 when the data transfer is complete.

Figure 6:
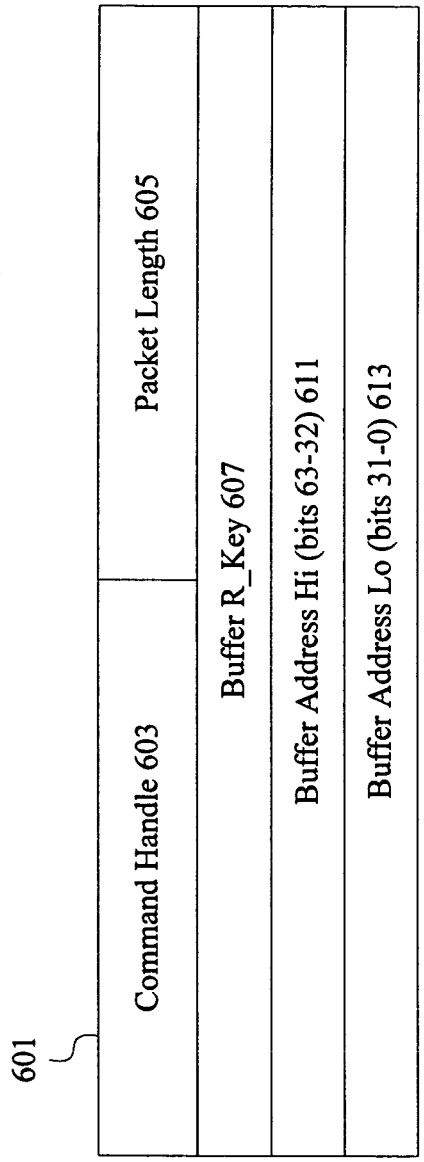
FIG. 6 is a diagrammatic representation showing a command descriptor.

FIGS. 6-8 are diagrammatic representations showing examples of descriptor formats used for transmission between servers and virtualization logic. Although common fields and parameters for descriptors are shown, it should be noted that a wide range of fields and parameters can be used. According to various embodiments, descriptors are created during transfer of data between server and virtualization logic. The virtualization logic allows servers to access peripherals or resources included in a remote entity.

FIG. 6 is a diagrammatic representation showing a command descriptor. According to various embodiments, the command descriptor is used to provide an address associated with a buffer read or write. The command descriptor 601 includes a command handle 603. In one example, the command handle is 16 bits. A length 605 and a buffer key 607 are also provided. Portions of the buffer address are provided in field 611 and 613. Bits 63-32 are provided in buffer address hi field 611 and bits 31-0 are provided in buffer address lo field 613.

FIG. 7 is a diagrammatic representation showing an initialization descriptor. The initialization descriptor is used to provide base buffer addresses, ring size, and index addresses. According to various embodiments, the initialization descriptor includes an 8-bit type field, an 8-bit entry size 705, and a 16-bit descriptor ring size 707. The 32-bit fields include a read index address key 711, a base address key 713, read index address hi bits 715, read index address low bits 717, base address hit bits 719, and base address low bits 721. A reserved field 709 can be maintained for additional parameters.

FIG. 8 is a diagrammatic representation showing a completion descriptor. The completion descriptor includes a type field 801, a read index 803, a completion count 805, a reserved field 807, and multiple completion entries 809 and 811. A completion entry includes a command handle 821, packet length 823, a status field 825, and a reserved field 827. Although particular bit lengths are described above, it should be noted that a wide variation of bit lengths can be used. Additional descriptors or a subset of descriptors may also be used.

Figure 9:
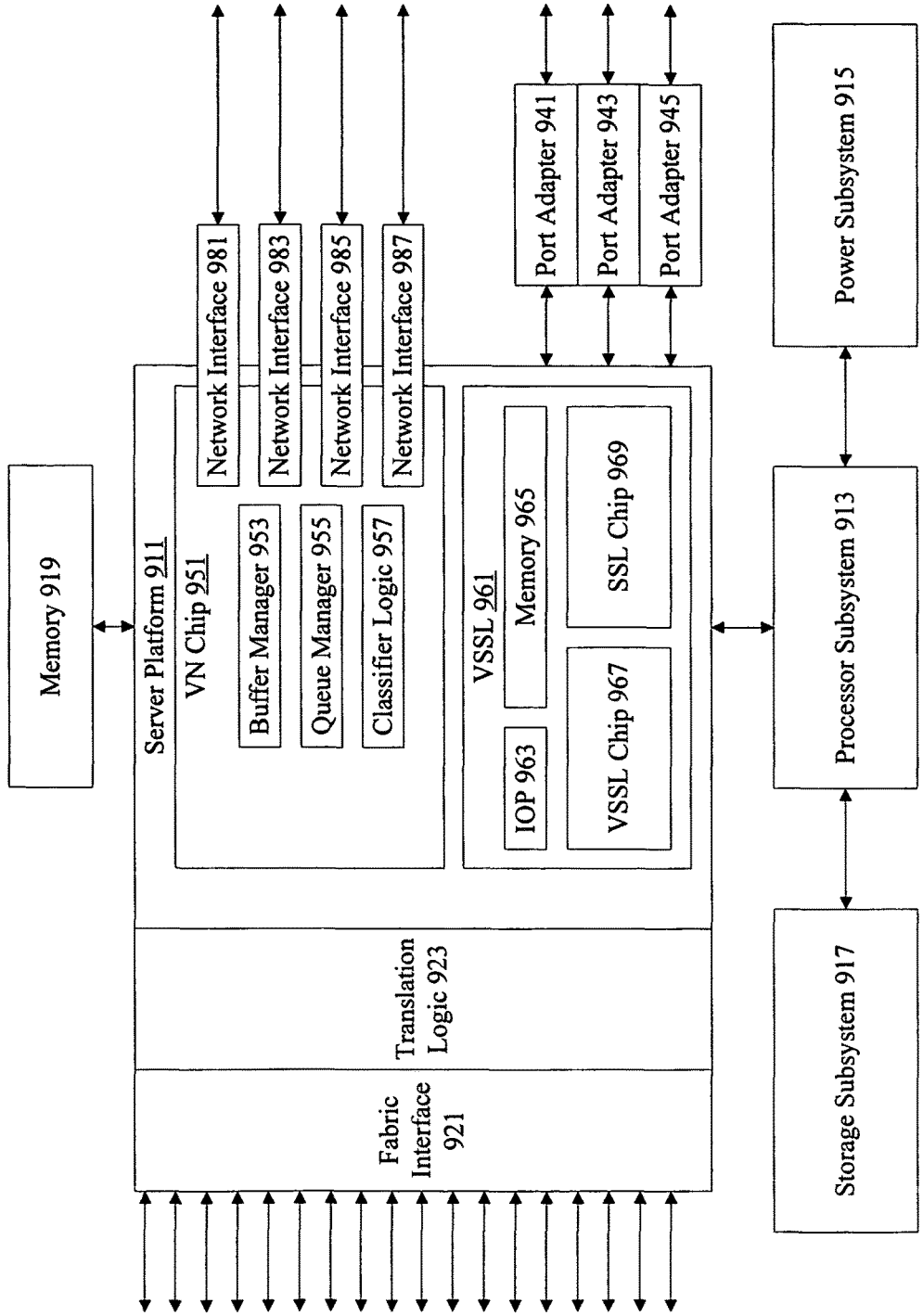
FIG. 9 is a diagrammatic representation showing a remote entity.

FIG. 9 is a diagrammatic representation showing one example of a remote entity. Fabric interface 921 is connected to multiple computer systems using a network such as Infiniband. Port adapters 941-945 are associated with multiple resources such as HBAs, SATAs, hardware accelerators, etc. According to various embodiments, a VNIC chip or VN chip 951 has integrated virtualization logic and port adapters in network interfaces 981-987. A VSSL card 961 also has integrated virtualization logic included in VSSL chip 967 as well as an SSL accelerator 969. Although only a VNIC and a VSSL are shown, it should be recognized that a variety of other virtualization mechanisms such as VHBAs and VXMLs can be included. The network interfaces 981-987 may be MAC interfaces associated with multiple gigabyte ports. According to various embodiments, network interfaces 981-987 include logic mechanisms conventionally found in a NIC. The server platform 911 manages interaction between the servers connected to the fabric interface 921 and various resources associated with the port adapters 941-945 and network interfaces 981-987. In one example, port adapters are stand alone entities such as HBA cards while network interfaces are interface with a VN chip 951.

The platform 911 is associated with memory 919 and a processor subsystem 913, a power subsystem 915, and a storage subsystem 917. In some embodiments, the platform 911 includes tables with information mapping various servers connected through the fabric interface 921 and various port adapter resources and network interfaces. The processor subsystem 913 is configured to manage port adapter resources as though the port adapters and network interfaces 981-887 were included in individual servers. In one example, the processor subsystem 913 is configured to initialize an IP network connection regardless of whether servers have been connected to the server platform 911.

According to various embodiments, a VSSL card 961 is coupled to translation logic 923. In some embodiments, a VSSL card 961 is separate from a VNIC or VN chip or card 951. The VSSL card includes a VSSL chip 967. In some embodiments, the VSSL chip 967 polls transmit and receive queues associated with various servers. When it sees a packet in a server transmit queue, it pulls the packet and forwards associated commands to an SSL chip 969. SSL chip 969 can be one of a number of available SSL accelerators, such as the Nitrox Chip available from Cavium Networks of Mountain View, Calif. It should be noted that although a VSSL card 961 and a VN chip 951 are shown, virtualization logic and accelerator functionality can also be implemented in a single chip. Alternatively, a VN chip 951 may be separated out into multiple components and implemented as a card. In still other implementations, all virtualization logic for the VN chip 951, the VSSL card 961, and any other components is implemented in a single device. In one embodiment, an SSL chip 969 includes general purpose processor cores and specialized cryptography cores included on a single ASIC. The cryptography cores may include SSL cores, IP Security (IPSec) cores, SSL-VPN cores, XML/web services cryptography cores, storage and fibre channel data cryptography cores, and email data cryptography cores.

IOP 963 is configured to perform context management for SSL chip 969. According to various embodiments, an SSL agent runs on IOP 963. The SSL agent manages and allocates key memory and context memory. A context is used for each SSL connection. A context is allocated before a new SSL connection is established. According to various embodiments, context can be established in several manners.

A server can send a context allocation request to the SSL transmit queue. The VSSL chip 967 pulls this request and notifies the SSL agent running on IOP 963. The SSL agent allocates a new context and passes an index back to the VSSL chip 967. The VSSL chip 967 sends the response back to the server's receive queue. An application will now have a context allocated for it and the context can be passed in for all SSL requests.

Alternatively, an SSL agent could allocate a pool of contexts per server. Whenever an application needs a new context, it could get the context locally from the VSSL driver (which keeps a cache of the contexts). Once the VSSL driver's cache runs out of contexts, it sends a request to the SSL Agent to obtain additional contexts.

According to various embodiments, a VNIC chip or VN chip 951 is also coupled to the servers. In one example, the VN chip 951 is connected to the fabric interface 921 through optional translation logic 923. The VN chip 951 also has a connection with the processor subsystem 913 and a series of network interfaces 981-987 connecting the VN chip 951 to external network entities. In other examples, the VN chip may not include NIC interfaces and instead may be connected to conventional NICs.

The VNIC chip includes classifier logic 947, a queue manager 945, and a buffer manager 943. According to various embodiments, the classifier logic 947 includes parse and lookup logic configured to identify information such as a packet destination server and priority. Classifier logic can also be used to filter incoming data or apply traffic policing policies. In some instances, classifier logic can be used to block packets in order to implement a firewall. In one embodiment, classifier logic 947 parses a packet and uses the information in the packet to identify entries in lookup tables. The data is then buffered. Buffer manager 943 manages data in memory associated with the VN chip 951. Queue manager 945 manages descriptors for data posted. A descriptor can include a reference to a memory location, a length, a source port, and a multicast count, as well as other parameters.

In one example, classifier logic 947 determines that the packet received is a high priority packet and should be placed in a high priority queue by the buffer manager 943. Parameters provided may include a pointer, a length, a source port, a multicast count, and a queue identifier. The data is then placed into memory and information referencing the data such as a pointer and a length is posted into a buffer ring or a descriptor ring. When a connected server successfully arbitrates for bus access, the server reads the buffer ring or descriptor ring and obtains the data from memory associated with the VN chip. According to various embodiments, the server reads the data directly into its own memory.

Each individual server may also include descriptor queues. As will be appreciated, the servers connected to the network switch and the remote entity arbitrate for access to the I/O Bus. When access is obtained, data can be read from memory associated with one of the server based on the information provided in the descriptor queues.

Redundancy mechanisms are also provided to allow continued operation in the event that a NIC or other resource fails or a remote entity itself fails. Redundancy mechanisms can be managed by a VNIC device or VN chip, a remote entity, or by the individual servers themselves.

Figure 10:
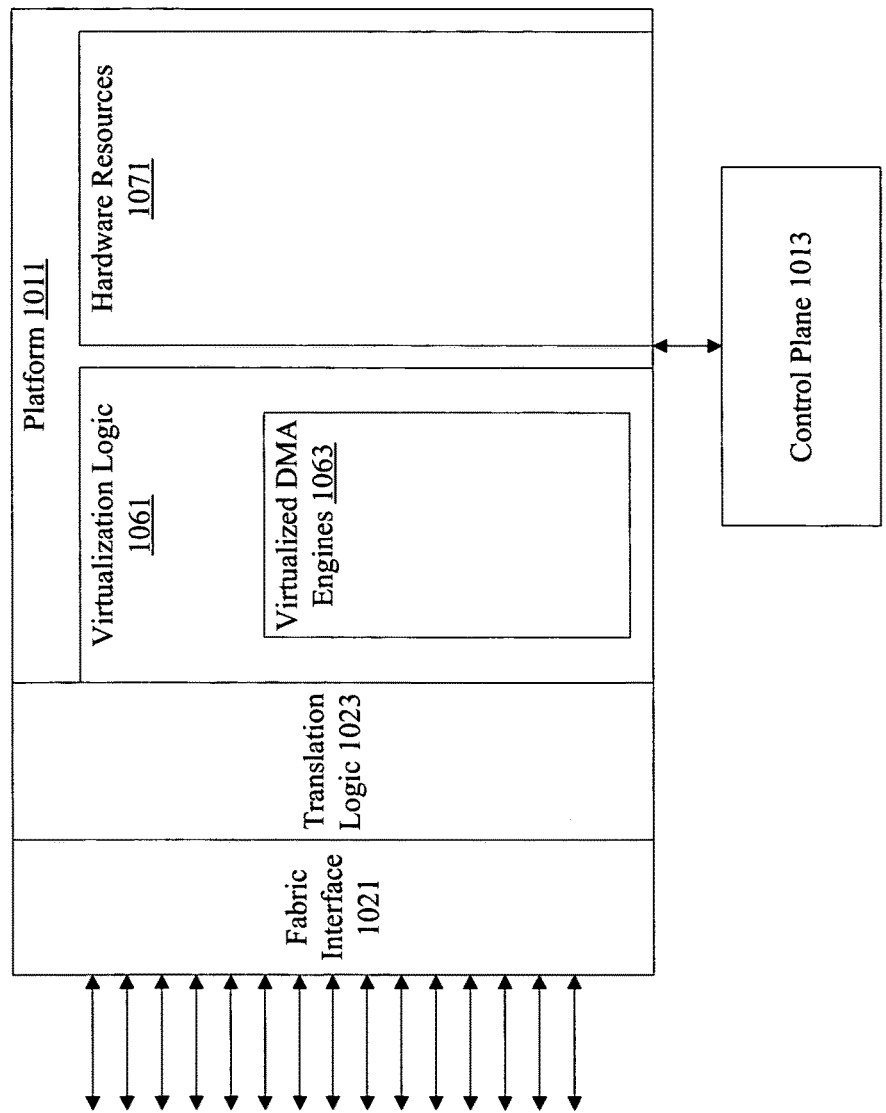
FIG. 10 is a diagrammatic representation showing a remote entity having virtualization logic and resources.

FIG. 10 is a diagrammatic representation depicting an embodiment of a remote entity using virtual Direct Memory Access (DMA) engines. According to various embodiments, a virtual DMA engine and a particular resource is assigned to each application, guest operating system, system image, virtual server, or physical server to provide true hardware acceleration on demand.

A fabric interface 1021 is connected to multiple computer systems using a network such as Infiniband and translation logic 1023. Virtualization logic 1061 obtains data such as descriptor data from individual servers and provides the data to hardware resources 1071. In some examples, data transfer is performed using virtualized Direct Memory Access (DMA) mechanisms to allow minimal processor involvement during data transfers. In some embodiments, a descriptor is provided on a descriptor queue. The descriptor includes addresses, lengths, and other data parameters. A virtualized DMA engine 1063 in virtualization logic 1061 reads the descriptor and directly transfers the block of data in memory to appropriate hardware resources 1071.

In addition, although exemplary techniques and devices are described, the above-described embodiments may be implemented in a variety of manners, media, and mechanisms. For instance, instructions and data for implementing the above-described invention may be stored on a disk drive, a hard drive, a floppy disk, a server computer, or a remotely networked computer. Hardware used to implement various techniques may be embodied as racks, cards, integrated circuited devices, or portions of semiconductor chips. Accordingly, the present embodiments are to be considered as illustrative and not restrictive, and the invention is not to be limited to the details given herein, but may be modified within the scope and equivalents of the appended claims.

What is claimed is:

1. A method for transferring data between a remote entity and a plurality of servers, the method comprising:
   receiving, by the remote entity from a first server of the plurality of servers, a first request for access to a first peripheral of a plurality of peripherals, the remote entity comprising the plurality of peripherals, the receiving the first request comprising:
      receiving a first write index, of a first server descriptor ring associated with the first server, using a Remote Direct Memory Access capable network;
   receiving, by the remote entity from a second server of the plurality of servers, a second request for access to the first peripheral, the receiving the second request comprising:
      receiving a second write index, of a second server descriptor ring associated with the second server, using the remote direct memory access capable network;
   wherein a different server descriptor ring is associated with each server of the plurality of servers, each different server descriptor ring comprising a respective write index, a respective read index, respective instructions, and respective commands for the respective server associated with the server respective different descriptor ring;
   transmitting to the first server a first read data buffer request from virtualization logic, wherein the first read data buffer request is sent from the remote entity to the server in response to the remote entity receiving the first write index of the first server descriptor ring from the first server;
   transmitting to the second server a second read data buffer request from the virtualization logic, wherein the second read data buffer request is sent from the remote entity to the second server in response to the remote entity receiving the second write index of the second server descriptor ring from the second server;
   enforcing traffic policing policies, by the remote entity with the virtualization logic associated with the remote entity, to prioritize access to each of the plurality of peripherals using a virtual device driver for the peripheral, wherein the virtualization logic allows each of the plurality of peripherals to be shared by the plurality of servers based at least in part on the different server descriptor rings, wherein the plurality of peripherals comprise peripheral interfaces, peripheral components, and one or more host bus adapters, one or more network interface cards, and at least one of a cryptographic accelerator or an eXtensible Markup Language accelerator, and wherein the access to each of the plurality of peripherals comprises requests from the first server and the second server forwarded to one network interface card of the one or more network interface cards, the remote entity:
receiving server traffic comprising:
receiving data transferred from the first server to the remote entity in response to the first read data buffer request;
receiving data transferred from the second server to the remote entity in response to the second read data buffer request;
performing packet inspection to classify at least some of the server traffic with classifier logic, the performing packet inspection comprising parsing data packets of the server traffic and utilizing lookup logic to determine priorities attributed to the data packets;
placing the data packets into at least one prioritized queue based at least in part on the priorities determined;
placing selected data into memory associated with the first peripheral; and
posting a reference to the selected data, and facilitating reading of the selected data associated with the first peripheral by the first server or the second server to obtain the selected data from the memory associated with the first peripheral.

2. The method of claim 1, further comprising, after receiving the first write index of the first server descriptor ring and before transmitting the first read data buffer request:
sending a remote direct memory access read descriptor request from the virtualization logic;
receiving one or more descriptor entries from the first server descriptor ring associated with the first server, the one or more descriptor entries including a pointer and a number of bytes; and
sending a remote direct memory access write providing a read index, wherein transferring the data from the first server to the remote entity is based on the read index.

3. The method of claim 2, further comprising transmitting to the first server a completion message from the virtualization logic.

4. The method of claim 1, wherein the remote direct memory access capable networking technology is InfiniBand.

5. The method of claim 1, wherein the remote direct memory access capable networking technology is remote direct memory access over Ethernet.

6. The method of claim 1, wherein the remote direct memory access capable networking protocol is iSER.

7. The method of claim 1, wherein the remote direct memory access capable networking protocol is SRP.

8. A system for transferring data between a remote entity and a plurality of servers, the system comprising:
a remote entity comprising a plurality of peripherals, the plurality of peripherals comprising:
peripheral interfaces, peripheral components, one or more host bus adapters, one or more network interface cards, and at least one of a cryptographic accelerator or an eXtensible Markup Language accelerator;
the remote entity to:
receive, from a first server of the plurality of servers, a first request for access to a first peripheral of a plurality of peripherals, the receiving the first request comprising:
receiving a first write index, of a first server descriptor ring associated with the first server, using a Remote Direct Memory Access capable network;
receive, from a second server of the plurality of servers, a second request for access to the first peripheral, the receiving the second request comprising:
receiving a second write index, of a second server descriptor ring associated with the second server, using the Remote Direct Memory Access capable network;
wherein a different server descriptor ring is associated with each server of the plurality of servers, each different server descriptor ring comprising a respective write index, a respective read index, respective instructions, and respective commands for the respective server associated with the server descriptor ring;
transmit to the first server a first read data buffer request from virtualization logic, wherein the first read data buffer request is sent from the remote entity to the server in response to the remote entity receiving the first write index of the first server descriptor ring from the first server;
transmit to the second server a second read data buffer request from the virtualization logic, wherein the second read data buffer request is sent from the remote entity to the second server in response to the remote entity receiving the second write index of the second server descriptor ring from the second server;
enforce traffic policing policies, with the virtualization logic associated with the remote entity, to prioritize access to each of the plurality of peripherals using a virtual device driver for the peripheral, wherein the virtualization logic allows each of the plurality of peripherals to be shared by the plurality of servers based at least in part on the different server descriptor rings, and wherein the access to each of the plurality of peripherals comprises requests from the first server and the second server forwarded to one network interface card of the one or more network interface cards, the remote entity:
receiving server traffic comprising:
receiving date transferred from the first server to the remote entity in response to the first read data buffer request;
receiving data transferred from the second server to the remote entity in response to the second read data buffer request;
performing packet inspection to classify at least some of the server traffic with classifier logic, the performing packet inspection comprising parsing data packets of the server traffic and utilizing lookup logic to determine priorities attributed to the data packets;
placing the data packets into at least one prioritized queue based at least in part on the priorities determined;
placing selected data into memory associated with the first peripheral; and
posting a reference to the selected data, and facilitating reading of the selected data associated with the first peripheral by the first server or the second server to obtain the selected data from the memory associated with the first peripheral.

9. The system of claim 8, wherein, after receiving the first write index of the first server descriptor ring and before transmitting the first read data buffer request:
sending a remote direct memory access read descriptor request from the virtualization logic;
receiving by the first server one or more descriptor entries from the first server descriptor ring associated with the first server, the one or more descriptor entries including a pointer and a number of bytes; and sending a remote direct memory access write providing a read index, wherein transferring the data from the virtualization logic is based on the read index.

10. The system of claim 8, wherein the remote direct memory access capable networking technology is Infini-Band.

11. The system of claim 8, wherein the remote direct memory access capable networking technology is remote direct memory access over Ethernet.

12. The system of claim 8, wherein the remote direct memory access capable networking protocol is iSER.

13. The system of claim 8, wherein the remote direct memory access capable networking protocol is SRP.

* * * * *